Sept. 3, 1957  M. LIEBHART ET AL  2,804,975
SCREENING DEVICE HAVING A ROTATING SIEVE DRUM
Filed Sept. 1, 1953  2 Sheets-Sheet 1
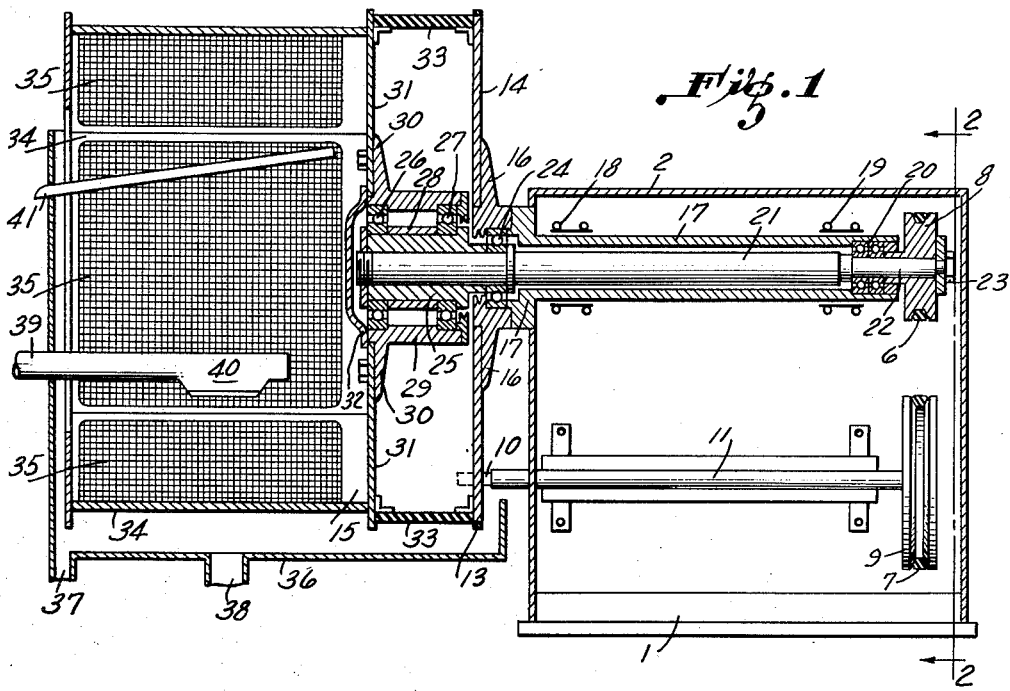
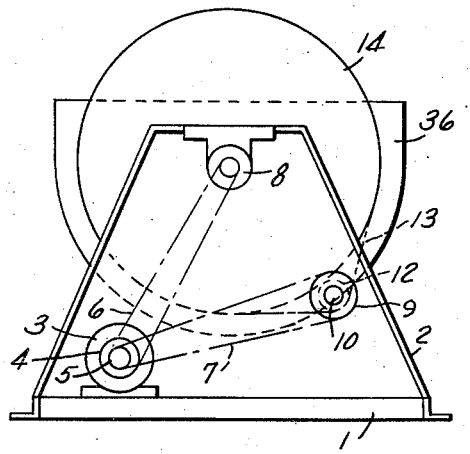
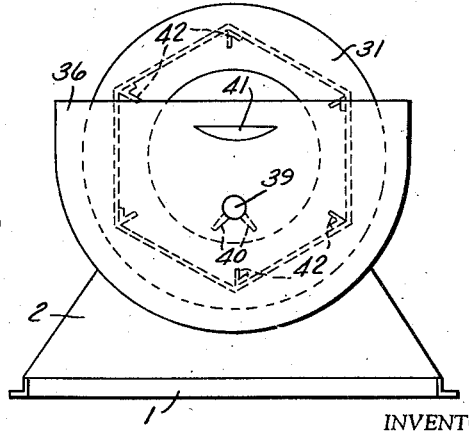
INVENTORS
MAX LIEBHART &
ALWIN BELLINGER &
ERNST BRUCKNER
BY
ATTORNEY Sept. 3, 1957  M. LIEBHART ET AL  2,804,975
SCREENING DEVICE HAVING A ROTATING SIEVE DRUM
Filed Sept. 1, 1953

INVENTORS
MAX LIEBHART &
ALWIN BELLINGER &
ERNST BRUCKNER

2,804,975

SCREENING DEVICE HAVING A ROTATING SIEVE DRUM

Max Liebhart and Alwin Bellinger, Staffel (Lahn), and Ernst Brückner, Selb, Germany, assignors to Gebruder Netzsch, Selb, Germany, a German firm Application September 1, 1953, Serial No. 377,926

Claims priority, application Germany September 3, 1952

9 Claims. (Cl. 209—287)

The invention relates to an apparatus for screening ceramic materials by means of a rotating sieve drum. According to the invention the sieve drum vibrates during its rotation, whereby the output of the screening device is increased suchwise that the dimensions of the sieves may considerably be diminished.

The small sieve surfaces may easily be kept free of residues of the goods to be screened and may be cleaned during the operation by rinsing with water. Besides, other important advantages are obtained and the entire apparatus may be produced in a simple way and requires small space.

The drawings show by way of example two embodiments of the invention schematically.

Fig. 1 is a longitudinal section through one embodiment of an apparatus according to the invention.

Fig. 2 is a section taken on line 2—2 of Fig. 1 in the direction of the arrows and in a smaller scale.

Fig. 3 is a side view of Fig. 1 on a smaller scale.

Figure 4:
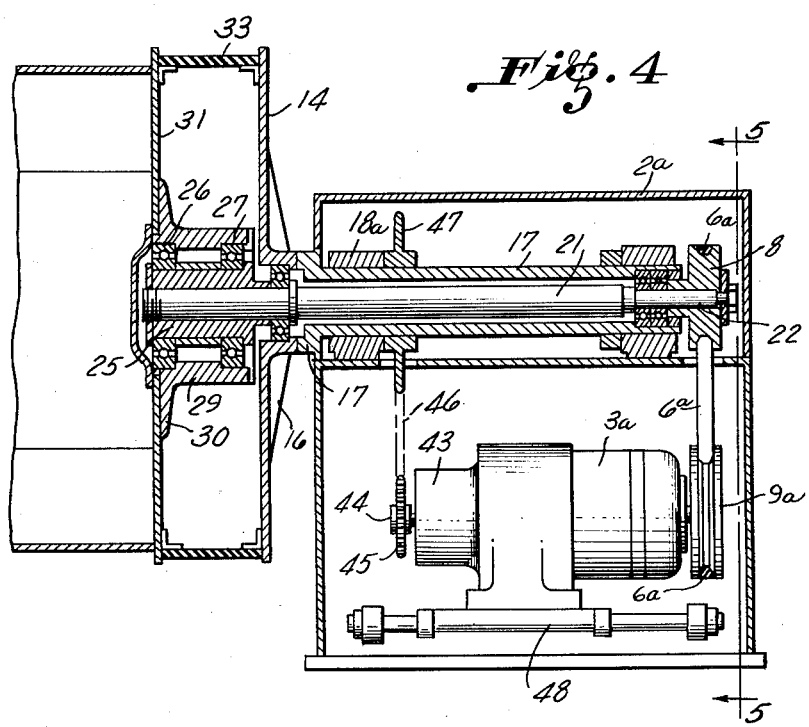
Fig. 4 is a vertical section through a second embodiment of the invention.

Referring first to Fig. 1 to 3, 1 designates a bottom plate carrying a casing 2 containing the driving means, e. g. an electromotor 3 and the driving shafts. Two pulleys 4 and 5 of different diameters are fastened to the motor shaft, said pulleys driving, by means of belts, keybelts or ropes 6 and 7 the disks 8 and 9 respectively.

The disk 9 is fastened to the one end of a shaft 10 rotating within a tube 11, and to the other end of said shaft a pulley 12 is attached driving a disk 14 by means of a belt 13, said disk serving for driving the drum-shaped sieve cage 15.

The disk 14 is fastened to a flange 16 attached to the front end of a hollow shaft 17 supported within the casing 2 by bearings 18 and 19 and forming the carrier of sieve cage 15. In the opposite end of said hollow shaft the projection 22 of a shaft 21 is supported by means of ball bearings 20, said shaft 21 extending through the whole length of the hollow shaft. On the projection 22 the pulley 8 is fastened by means of a screw 23.

At the opposite end of the hollow shaft 17 a ball bearing 24 is provided supporting the other end of the shaft 21 to which an eccentrical sleeve 25 is fastened carrying a rotatable pipe 29 by means of ball bearings 26 and 27 kept in their positions by a distance piece 28. The amplitude of the eccentrical sleeve is very small (about 1 mm.). The pipe 29 surrounds the ball bearings 26 and 27 and is provided with a flange 30 carrying a disk 31 which forms the rear wall of the sieve cage 15. The inner end of the shaft 21 is covered by a cap 32 fastened at the front side of the pipe 29. The disks 14 and 31 are connected with each other near their circumference by a ring 33 consisting of a flexible material such as rubber sponge.

To the disk 31 the sieve frame 34 of the prismatic cage 15 is fastened. The frame 34 carries the sieve 35. A trough 36 serving for receiving the screened goods surrounds the lower portion of the sieve frame and is provided with exit openings 37 and 38.

The material is fed into the inner space of the sieve cage 15 through the feeding pipe 39 which latter is supported by the front wall of the trough 39 and having nozzles 40 therein. Besides, a chute 41 extends into the cage 15 which chute is also supported by the front wall of the trough 39 and extends over this wall outwardly. At the inner edges of the sieve cage which has a hexagonal cross section, longitudinal bars 42 are provided, each having an angular cross section, said bars extending into the inner space of the cage.

When the electromotor 3 is switched on it drives the shaft 10 by means of the pulley 12 by means of the belt 7 and disk 9. A second belt 13 connects the said pulley 12 with the disk 14. In consequence of the repeated reduction the hollow shaft 17, the disk 14, and the sieve cage 15 rotate very slowly, about 2–4 revolutions/minute. The belt 6 transmits the drive to the shaft 21 and the eccentric 25 by means of the disk 8. As in this case the power transmission is not reduced but considerably increased, the eccentric 25 runs a great deal quicker (about 2000 revolutions/min.) than the sieve cage.

By the quickly rotating eccentric 25 a vibration of the sieve is produced in the following way:

The disk 14 with which the flange 16 of the hollow shaft 17 is firmly connected is slowly rotated by the belt 13. This rotation is transmitted to the disk-like wall 31 of the sieve cage 15 by means of the rubber sponge ring 33 whereby the pipe 29 at the flange 30 of which the disk 31 is fastened rolls on the eccentrical sleeve 25 by means of the ball bearing 26 and 27. The eccentrical sleeve itself is quickly rotated by the shaft 21. The pipe 29 participates in the eccentrical movement and transmits this movement to the wall 31 of the sieve cage by means of its flange 30. Thus the sieve cage 15 which is centrically rotated by the hollow shaft 17 is vibrated during this rotation by the eccentrical movement transmitted by the pipe 29 and the flange 30. This is rendered possible in consequence of the flexibility of the rubber sponge ring 33 forming the connection between the sieve cage 15 rotating with small eccentricity and the centrically rotating disk 14. In consequence of the small amplitude of the eccentric sleeve a slow swinging of the drum is avoided which would be the case with a larger amplitude.

By the continuous vibration of the sieve cage the sieve surfaces are kept clean and the sieve openings are kept free so that an undisturbed screening is warranted. In addition a rinsing or scavenging of the sieves is provided during the operation by passing water through the sieves in a direction opposite the screening direction.

The screened fine goods pass into the trough 36 and are delivered therefrom by the openings 37 and 38. The remaining goods are transported upwardly by the bars 42 working as catching pockets and escape along the chute 41.

The residues produced during the screening are therefore continuously removed so that they do not charge the screening surfaces during the screening process. The sieves or screens remain always clear and may be surveyed at any time to ascertain cracks or other bad conditions if any. The discharged coarse goods are returned to the twirling means.

Figure 5:
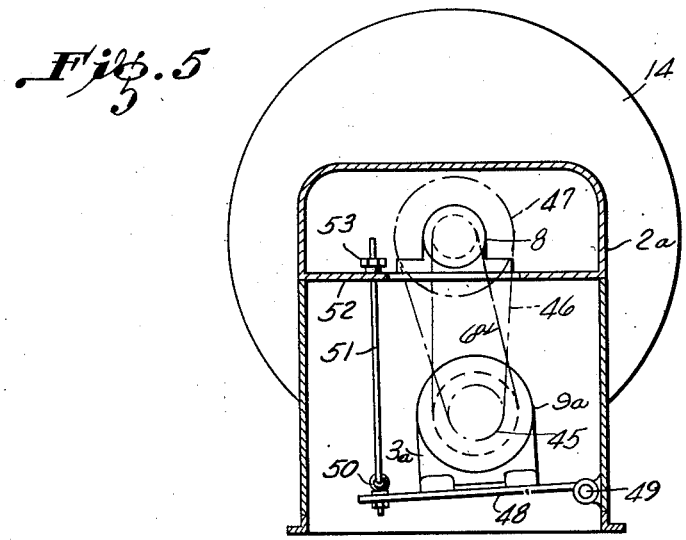
Fig. 5 is a section taken on line 5—5 of Fig. 4 in the direction of the arrows.

The embodiment of the invention illustrated in Figs. 4 and 5 differs from that shown in Figs. 1–3 only with respect to the driving means and the casing; the casing 2a contains the means for driving the sieve cage 15 and the eccentric sleeve 25 by which the vibration of the sieve cage is produced. In the lower portion of the casing the motor 3a is provided, carrying on its shaft a pulley 9a which drives, by means of a belt 6a, the disk 8 fixed on the projection 22 of the shaft 21. The eccentric sleeve 25 is firmly connected with the shaft 21 rotating within the hollow shaft 17 supported by the bearings 18a and carrying the disk 14 by means of a flange 16, as already described in connection with Figs. 1–3.

On the hollow shaft 17 a chain wheel 47 is fastened driven from a wheel 45 by means of a chain 46. This wheel 45 is fastened to the shaft 44 of a reduction gear provided in a prolongation 43 of the motor casing.

The motor 3a is carried by a balance frame or swipe 48 rockably mounted on an axis 49 provided at the inner wall of the casing 2a. The free end of the balance frame is provided with a ring 50 suspending from a rod 51. This rod passes through a supporting plate 52 and is provided, at its upper end, with a tension screw 53 abutting against the plate 52. By adjusting the screw 53 the chain 46 may be adjusted to the tension required for the power transmission, whereby the balance frame 48 is rocked with the motor 3a about the axis 49.

What we claim is:

1. A screening device, comprising in combination, a rotating sieve drum, a disk, a flexible ring connecting said drum with said disk, means for slowly rotating said disk and means comprising an eccentric sleeve acting on said drum to impart vibrations to the latter during its rotation, and means for rotating said sleeve at high speed.

2. A screening device comprising, in combination, a rotating sieve drum, a disk, a flexible ring connecting said drum with said disk, a casing, a hollow shaft rotatably supported in said casing and carrying said disk, means for slowly rotating said disk, a second shaft rotatably supported within said hollow shaft, means for rapidly rotating said second shaft and an eccentric sleeve arranged on said second shaft, acting on said drum to impart vibrations to the latter.

3. A screening device comprising, in combination, a rotating sieve drum, a disk, a flexible ring connecting said drum with said disk, a casing, a hollow shaft rotatably supported in said casing and carrying said disk, means for slowly rotating said disk, a second shaft rotatably supported within said hollow shaft, means for rapidly rotating said second shaft, an eccentric sleeve arranged on said second shaft, acting on said drum to impart vibrations to the latter and a motor provided on said casing and driving said disk as well as said second shaft.

4. A screening device comprising a rotary sieve drum having an end disk at right angles to the rotary axis of the drum, a sleeve secured to the end disk concentric with the rotary axis of the drum, a second sleeve mounted eccentrically within the first-mentioned sleeve, bearings between the sleeves, a shaft for the eccentric sleeve, means for rotating the shaft and eccentric sleeve to impart a vibratory movement to the drum, and means for rotating the drum.

5. A screening device according to claim 4, in which the speed of rotation of the drum is approximately from 2 to 4 revolutions per minute and the speed of rotation of the shaft and eccentric sleeve is approximately 2000 revolutions per minute.

6. A screening device according to claim 4, in which a second disk is provided spaced from the first-mentioned disk and comprising a part of the means for rotating the drum.

7. A screening device according to claim 4, in which a second disk is provided spaced from the first-mentioned disk and comprising a part of the means for rotating the drum, and in which a flexible ring is provided connected to the circumferential rim portions of the two disks covering the space between the two disks.

8. A screening device according to claim 4, in which the end disk is provided at one end of the drum and the other end of the drum being partially open for access to the interior of the drum.

9. A screening device according to claim 4, in which a hollow shaft is provided surrounding the shaft for the eccentric sleeve and forming the rotary support for the drum.

References Cited in the file of this patent

UNITED STATES PATENTS

| | | |
|---|---|---|
| 11,637 | Akins | Sept. 5, 1854 |
| 223,967 | Warren | Jan. 27, 1880 |
| 882,070 | King | Mar. 17, 1908 |
| 1,994,610 | Huyett | Mar. 19, 1935 |
| 2,283,153 | Koch | May 12, 1942 |
| 2,416,499 | Saxe | Feb. 25, 1947 |
| 2,570,527 | Dahl | Oct. 9, 1951 |